US008891641B2

(12) United States Patent
Oga (10) Patent No.: US 8,891,641 B2
(45) Date of Patent: Nov. 18, 2014

(54) OFDM MODULATED WAVE TRANSMITTER APPARATUS, OFDM MODULATED WAVE TRANSMISSION METHOD, AND PROGRAM

(75) Inventor: Toshiyuki Oga, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 169 days.

(21) Appl. No.: 13/521,059

(22) PCT Filed: Dec. 28, 2010

(86) PCT No.: PCT/JP2010/073781
§ 371 (c)(1),
(2), (4) Date: Jul. 9, 2012

(87) PCT Pub. No.: WO2011/086856
PCT Pub. Date: Jul. 21, 2011

(65) Prior Publication Data
US 2013/0034186 A1    Feb. 7, 2013

(30) Foreign Application Priority Data

Jan. 12, 2010    (JP) ................................. 2010-004135

(51) Int. Cl.
H04K 1/10    (2006.01)
H04B 1/04    (2006.01)
(52) U.S. Cl.
CPC .................................. *H04B 1/0475* (2013.01)
USPC ............................ 375/260; 375/296; 330/136
(58) Field of Classification Search
USPC ................................................. 375/296, 260
See application file for complete search history.

(56) References Cited

U.S. PATENT DOCUMENTS

2004/0047427 A1*    3/2004    Dostert et al. ................ 375/260
2004/0246050 A1*    12/2004   Kikuchi ......................... 330/136
2007/0223360 A1     9/2007    Ichihara
2009/0191923 A1     7/2009    Fudaba et al.
2009/0310705 A1*    12/2009   Fujimoto ....................... 375/296

FOREIGN PATENT DOCUMENTS

| JP | 2001-292034 | 10/2001 |
| JP | 2004-032591 | 1/2004 |
| JP | 2007-150872 | 6/2007 |
| JP | 2009-177640 | 8/2009 |
| WO | 0072546 | 11/2000 |

OTHER PUBLICATIONS

International Search Report PCT/JP2010/073781 dated Jan. 25, 2011, with English translation.

* cited by examiner

*Primary Examiner* — Eva Puente
(74) *Attorney, Agent, or Firm* — Young & Thompson (57) ABSTRACT

In an orthogonal frequency division multiplex (OFDM) modulated wave transmitter apparatus, a symbol mapping circuit and a serial/parallel (S/P) converter generate an OFDM symbol signal from transmission data. An inverse fast Fourier transform (IFFT) circuit, a parallel/serial (P/S) converting and guard interval (GI) adding circuit, a timing adjusting circuit, a digital/analog (D/A) converter, a frequency converter, a local oscillator and an analog filter generate an OFDM modulated wave signal from the OFDM symbol signal. A power amplifier (PA) control circuit limits a band of the OFDM symbol signal and generates a PS control signal and a PA control signal. A PA designates a voltage supplied from a DC/DC converter as a PS voltage and amplifies and outputs the OFDM modulated wave signal based on the PA control signal.

11 Claims, 6 Drawing Sheets

OFDM MODULATED WAVE TRANSMITTER APPARATUS, OFDM MODULATED WAVE TRANSMISSION METHOD, AND PROGRAM

TECHNICAL FIELD

The present invention relates to an orthogonal frequency division multiplex (OFDM) modulated wave transmitter apparatus in which a transmission power amplifier (PA) is embedded, an OFDM modulated wave transmission method, and a program.

BACKGROUND ART

An OFDM scheme uses a plurality of narrowband subcarriers and modulates the narrowband subcarriers to transmit a signal. Therefore, the OFDM scheme, whose frequency spectrum is close to a square shape as a whole, obtains high frequency utilization efficiency. In addition, the OFDM scheme is robust against a delayed wave because a symbol length is long as compared to a single carrier scheme. Further, the OFDM scheme can be robust within a multipath environment by adding a guard interval (GI).

In addition, in an orthogonal frequency division multiple access (OFDMA) scheme using the OFDM scheme, it is possible to simultaneously transmit information to a plurality of communication partners by allocating subcarriers to a plurality of information transmission destinations.

In an integrated services digital broadcasting-terrestrial (ISDB-T) scheme, which is a terrestrial digital television broadcasting scheme in Japan, a band segmented transmission-OFDM (BST-OFDM) scheme is adopted. In the BST-OFDM scheme, it is possible to select more appropriate settings (a radio modulation scheme, transmission power, and the like) according to a purpose, by dividing subcarriers of the OFDM scheme into groups called segment and allocating the segments to each purpose.

Further, in a long term evolution (LTE) system designed by Third Generation Partnership Project (3GPP), the OFDMA scheme is adopted for downlink from a base station to a mobile station and a single carrier-frequency division multiple access (SC-FDMA) scheme based on discrete Fourier transform (DFT)-spread OFDM is adopted for uplink from the mobile station to the base station.

In the SC-FDMA scheme based on the DFT-spread OFDM, a time waveform of a symbol sequence to be transmitted, is subjected to a DFT and then designated as an input of the OFDM scheme. Frequency components of the symbol-sequence time waveform to be transmitted, which are DFT output input to OFDM, may be allocated to subcarriers indicated in advance from the base station in subcarrier mapping. The number of allocated subcarriers is set according to demand, and not all subcarriers are constantly allocated.

Figure 6:
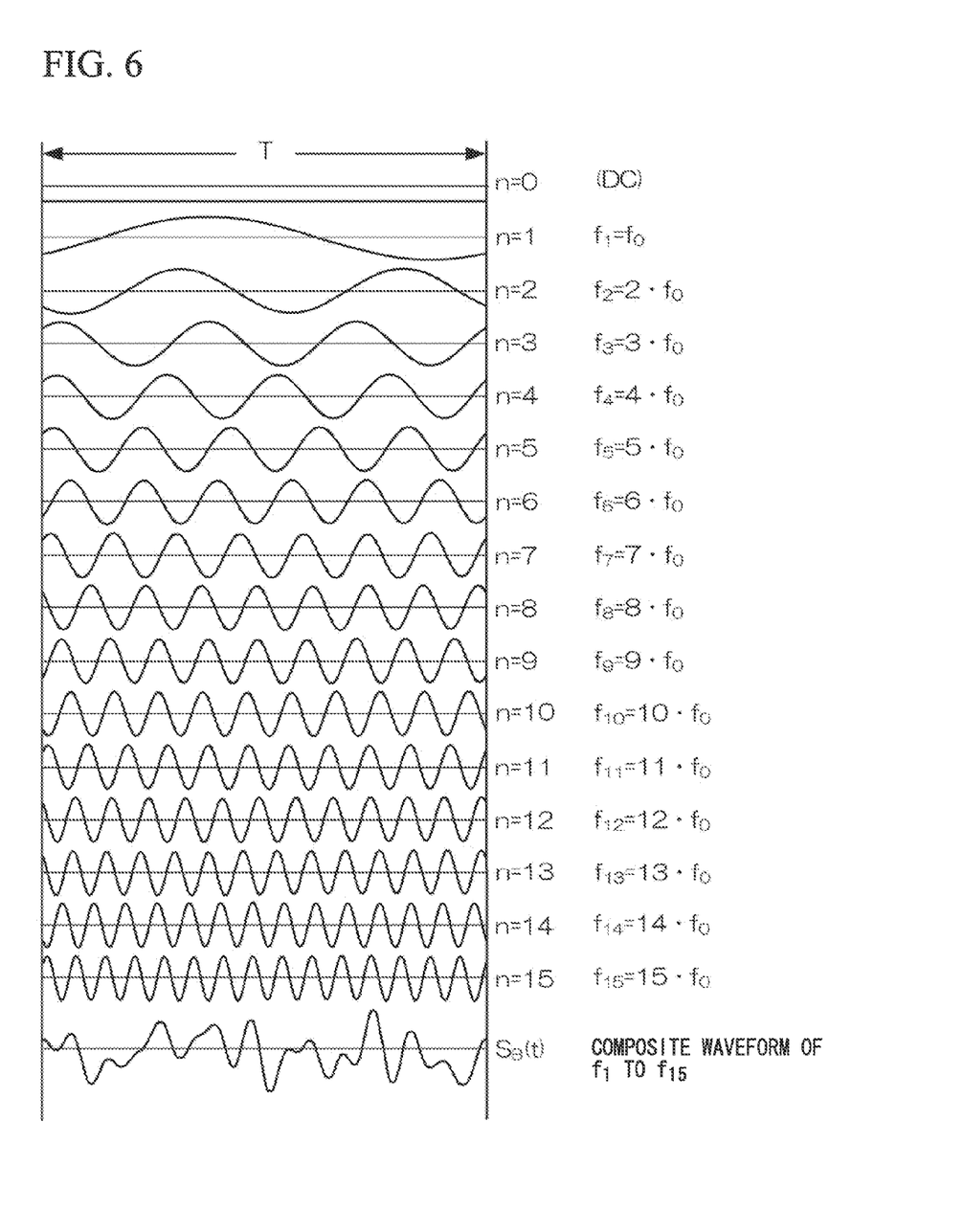
FIG. 6 is a conceptual diagram illustrating an OFDM baseband signal waveform in an OFDM modulated wave transmitter apparatus.

The OFDM scheme is multicarrier transmission comprised by many subcarriers. An OFDM signal, which is an output of the OFDM scheme, has high peak power when peak values of subcarriers overlap. An example of a baseband OFDM signal waveform is illustrated in FIG. 6. When the OFDM signal as described above is input to a PA having non-linearity characteristics, undesirable characteristic degradation, such as degradation of transmission characteristics or the increase of out-of-band radiation, is caused. Therefore, a PA having low non-linear distortion characteristics is needed for an OFDM modulated wave transmitter apparatus.

Generally, in case of a comparison under the same output power, an amplifier having higher saturation output power characteristics has lower non-linear distortion characteristics.

However, the amplifier as described above is not preferable in terms of the power efficiency because power consumption is high during a small signal of which non-linear distortion is not problematic. Consequently, it is necessary to improve the non-linear distortion characteristics without degrading the power efficiency.

To reduce the non-linear distortion in OFDM, a scheme of improving linearity during peak power generation is proposed, for example, in Patent Document 1. In the scheme of improving the linearity during the peak power generation, the linearity is improved by temporarily applying a high voltage or a large current to the PA when high peak power is generated. This scheme can improve transmission characteristics and out-of-band radiation characteristics of an OFDM signal in a range not exceeding a maximum rating of a component of a high-power amplifier and a range that does not adversely affect reliability.

DOCUMENTS OF THE PRIOR ART

Patent Documents

[Patent Document 1] Japanese Unexamined Patent Application, First Publication, No. 2001-292034

DISCLOSURE OF INVENTION

Problem to be Solved by the Invention

However, there are the following problems in the scheme of improving the linearity during the peak power generation according to Patent Document 1 described above.

The first problem is that a circuit scale increases. This is because it is necessary to additionally provide an analog/digital (A/D) conversion circuit, which performs A/D conversion again of an analog signal, to which concerted once from an OFDM signal generated by digital signal processing, and the result of the A/D conversion is used for control.

The second problem is that a circuit is weak against noise and interference from the environment. This is because an analog circuit, which is weak against noise as compared to a digital circuit, is used to perform the A/D conversion again of an analog signal, to which converted from an OFDM signal generated by digital signal processing, and the result of the A/D conversion is used for control. In particular, because the power of an output of a transmitter is usually high, it is necessary to take measures so that the output does not cause interference.

Accordingly, it is preferable that the OFDM signal generated by digital signal processing is processed as a digital signal.

The third problem is that power consumption is large when the OFDM signal has been processed as the digital signal. This is because the power consumption is increased due to the use of many digital arithmetic operations. In particular, there is a problem in that the power efficiency is not improved in a scheme in which states of use of subcarriers are non-uniform, as the BST-OFDM scheme or the SC-FDMA scheme based on DFT-spread OFDM. This is because, when the states of use of the subcarriers are on-uniform, a state of use of each subcarrier is not identified so that it is impossible to process suitably for a state of use of an individual subcarrier and, as a result, power consumption is not reduced.

The fourth problem is a cost increase caused by an increase of circuit scale, taking measures against noise and interference, and an increase of power consumption as described above.

The present invention has been made in view of such circumstances, and an object of the invention is to provide an OFDM modulated wave transmitter apparatus, an OFDM modulated wave transmission method, and a program, which can reduce a circuit scale, be robust against noise and interference from the environment, reduce power consumption, and be implemented at a low cost.

Means for Solving the Problem

According to the present invention for solving the above-described problems, there is provided an OFDM modulated wave transmitter apparatus including: an OFDM symbol signal generating circuit for generating an OFDM symbol signal from transmission data; an OFDM signal generating circuit for generating an OFDM modulated wave signal from the OFDM symbol signal; a control circuit for generating a power supply (PS) control signal and a PA control signal from the OFDM symbol signal; a converter for controlling an output voltage of a PS based on the PS control signal generated by the control circuit; and an amplifier for amplifying and outputting the OFDM modulated wave signal generated by the OFDM signal generating circuit based on at least one of the output voltage controlled by the converter and the PA control signal generated by the control circuit.

In addition, according to the present invention, there is provided an OFDM modulated wave transmission method including: a first step of generating an OFDM symbol signal from transmission data; a second step of generating an OFDM modulated wave signal from the OFDM symbol signal; a third step of generating a PS control signal and a PA control signal from the OFDM symbol signal; a fourth step of controlling an output voltage of a PS based on the PS control signal; and a fifth step of amplifying and outputting the OFDM modulated wave signal based on at least one of the controlled output voltage and the PA control signal.

In addition, according to the present invention, there is provided a program for causing a computer for controlling an OFDM modulated wave transmitter apparatus to execute: an OFDM symbol signal generating function of generating an OFDM symbol signal from transmission data; an OFDM signal generating function of generating an OFDM modulated wave signal from the OFDM symbol signal; a control function of generating a PS control signal and a PA control signal from the OFDM symbol signal; a converting function of controlling an output voltage of a PS based on the PS control signal; and an amplifying function of amplifying and outputting the OFDM modulated wave signal based on at least one of the controlled output voltage and the PA control signal.

Effect of the Invention

According to the present invention, it is possible to reduce an arithmetic operation amount and a circuit scale necessary for an arithmetic operation and hence reduce power consumption by employing a digital circuit, which is added to improve the power efficiency and non-linear distortion of an amplifier and increases resistance against noise and interference, and cutting down a digital arithmetic operation.

EMBODIMENTS FOR CARRYING OUT THE INVENTION

Hereinafter, the embodiments of the present invention will be described with reference to the drawings.

First Embodiment

Figure 1:
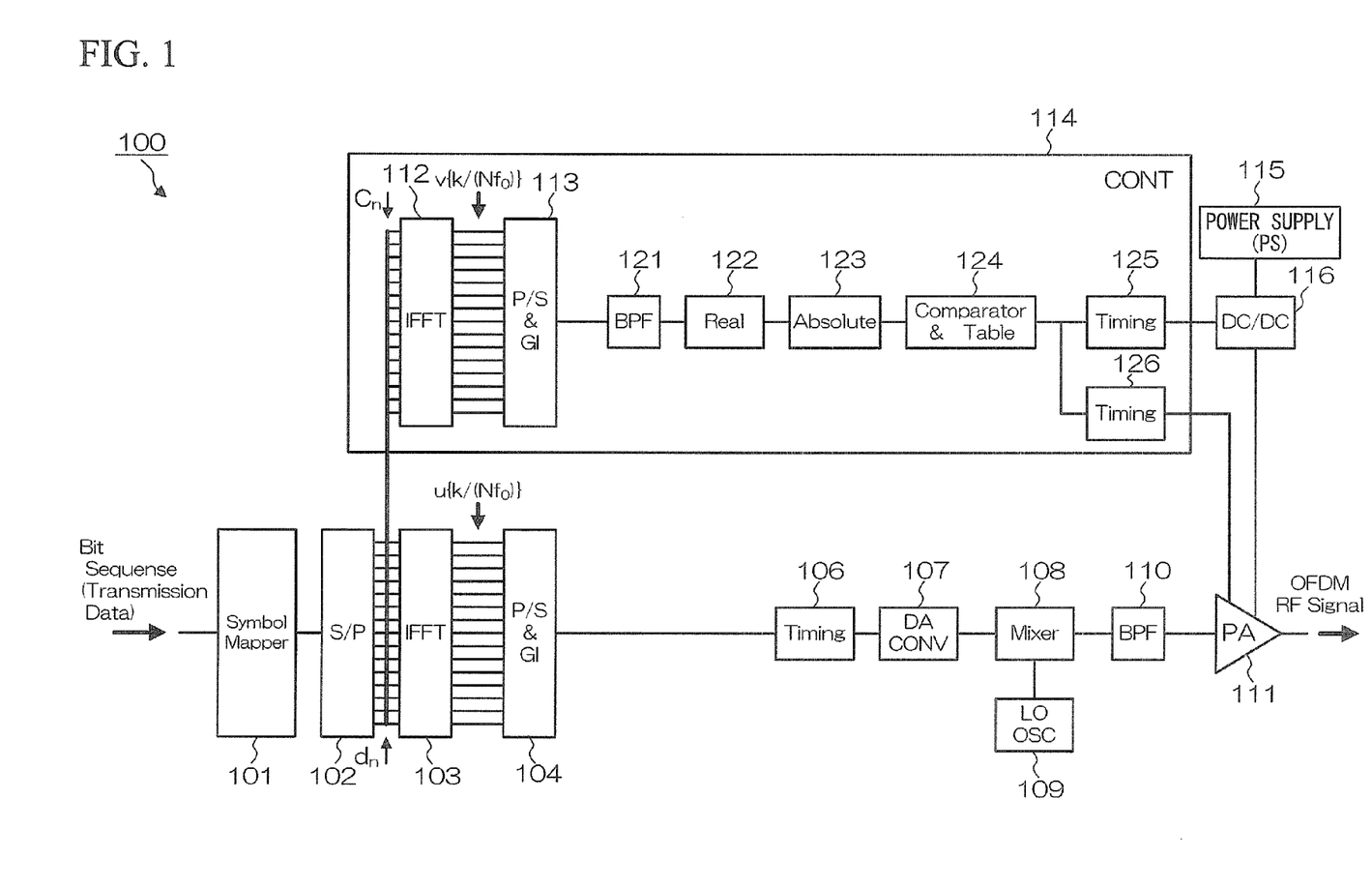
FIG. 1 is a block diagram illustrating an OFDM modulated wave transmitter apparatus according to a first embodiment of the present invention.

FIG. 1 is a block diagram illustrating an OFDM modulated wave transmitter apparatus according to the first embodiment of the present invention. In the drawing, the OFDM modulated wave transmitter apparatus 100 includes a symbol mapping circuit (Symbol Mapper) 101, a serial/parallel (S/P) converter 102, an inverse fast Fourier transform (IFFT) circuit 103, a parallel/serial (P/S) converting and GI adding circuit 104, a timing adjusting circuit (Timing) 106, a digital/analog (D/A) converter 107, a frequency converter (Mixer) 108, a local oscillator (LO OSC) 109, an analog filter (band-pass filter (BPF)) 110, a power amplifier (PA) 111, a PA control circuit (control circuit) (CONT) 114, a power supply (PS) 115, and a DC/DC converter (DC/DC) 116. The OFDM modulated wave transmitter apparatus according to this embodiment includes an OFDM symbol signal generating circuit having the symbol mapping circuit 101 and the S/P converter 102 and an OFDM signal generating circuit having the IFFT circuit 103, the P/S converting and GI adding circuit 104, the timing adjusting circuit 106, the D/A converter 107, the frequency converter 108, the local oscillator 109, and the analog filter 110.

The PA control circuit (control circuit) 114 includes an IFFT circuit 112, a P/S converting and GI adding circuit 113, a digital filter (BPF) 121, a real component extraction circuit (Real) 122, an amplitude detecting circuit (Amplitude Detector) 123, a control signal converting circuit (Comparator & Table) 124, and timing adjusting circuits 125 and 126.

The symbol mapping circuit 101 receives a bit sequence including transmission data, and outputs a symbol of each OFDM subcarrier to the S/P converter 102. Each symbol corresponds to a combination of amplitude and phase on a phase plane in one-to-one correspondence. The S/P converter 102 receives the symbol of each OFDM subcarrier and outputs a parallel conversion output to the IFFT circuits 103 and 112.

The IFFT circuit 103 receives the symbol of each OFDM subcarrier subjected to parallel conversion, transforms the symbol according to an IFFT, and outputs the transformed symbol. The P/S converting and GI adding circuit 104 receives an IFFT output from the IFFT circuit 103, and outputs a complex digital baseband signal, which is a complex number.

The timing adjusting circuit 106 receives the complex digital baseband signal, delays the received complex digital baseband signal by a predetermined time, and outputs the delayed complex digital baseband signal. The D/A converter 107 receives the complex digital baseband signal, which is the output of the timing adjusting circuit 106, and outputs a complex analog baseband signal having an in-phase signal (I signal) and a quadrature signal (Q signal).

The frequency converter 108 receives the complex analog baseband signal and a local oscillation signal, which is an output of the local oscillator 109, and generates a carrier-band OFDM signal. The analog filter 110 receives the carrier-band OFDM signal from the frequency converter 108, removes an undesired wave, and outputs a removal result to the PA 111.

On the other hand, the parallel conversion output from the S/P converter 102 is input to the IFFT circuit 112 of the PA control circuit 114. The IFFT circuit 112 receives the parallel conversion output, and outputs complex time waveform data for PA control by performing the IFFT. The P/S converting and GI adding circuit 113 receives an IFFT output from the IFFT circuit 112, and outputs a complex digital baseband signal for PA control, which is a complex number.

The digital filter 121 receives the complex digital baseband signal for PA control, removes a component in an unnecessary band, and outputs a removal result. The real component extracting circuit 122 receives the complex digital baseband signal for PA control, which is the output of the digital filter 121, and outputs a real digital baseband signal for PA control, which is a real component. The amplitude detecting circuit 123 receives the real digital baseband signal for PA control, and outputs an amplitude signal.

The control signal converting circuit 124 receives the amplitude signal, and generates and outputs a PS control signal and a PA control signal. The timing adjusting circuit 125 receives the PS control signal, delays the received PS control signal by a predetermined time, and outputs the delayed PS control signal. The timing adjusting circuit 126 receives the PA control signal, delays the received PA control signal by a predetermined time, and outputs the delayed PA control signal. The DC/DC converter 116 receives the PS control signal from the timing adjusting circuit 125, converts a PS voltage from the PS 115 based on the PS control signal, and outputs voltage converted power to the PA 111.

The PA 111 receives the carrier-band OFDM signal from the analog filter 110, the PA control signal from the timing adjusting circuit 126, and the voltage converted power from the DC/DC converter 116, and outputs an amplified carrier-band OFDM signal.

Next, an operation of the first embodiment will be described.

A bit sequence including transmission data, when input to the OFDM modulated wave transmitter apparatus 100, is input to the symbol mapping circuit 101. In OFDM, data transmission is performed by digital modulation on a plurality of subcarriers, respectively. The digital modulation is used to perform transmission by associating data with a discrete position (symbol point) on the phase plane.

For example, according to a quadrature phase shift keying (QPSK) modulation scheme, two-bit information is transmitted in one symbol because four symbol points are defined and identified. Likewise, according to a 64 quadrature amplitude modulation (64QAM) modulation scheme, 64 symbol points are defined and six-bit information is transmitted in one symbol. An operation of associating data to be transmitted with the symbol points, in other words, discrete position coordinates on the phase plane corresponding to the symbol points, is referred to as mapping.

The symbol mapping circuit 101 distributes the bit sequence including the input transmission data to subcarriers, further performs mapping to a symbol point of each subcarrier, and outputs a mapping result. Therefore, an output of the symbol mapping circuit 101 includes a subcarrier frequency and symbol point information associated with each subcarrier. The symbol point information is given as discrete amplitude and phase in a polar coordinate model. The symbol point information is given as coordinate values of discrete in-phase and quadrature components in an orthogonal coordinate model. Single-symbol point information is referred to as a complex symbol.

Here, in an example of the orthogonal coordinate model, a complex symbol $d_n$ for modulating an $n^{th}$ subcarrier is defined by the following Expression (1). In addition, j denotes an imaginary unit.

$$d_n = a_n + jb_n \ (n=0, \ldots, N-1) \tag{1}$$

The S/P converter 102 converts an output of the symbol mapping circuit 101, which is time-series data, into parallel data for which the IFFT circuit 103 can perform an IFFT. Here, serial-to-parallel conversion is performed for the complex symbol $d_n$. This is also subcarrier allocation related to the IFFT.

The complex symbol $d_n$, subjected to parallel conversion and allocated to each subcarrier of OFDM, is subjected to the IFFT by the IFFT circuit 103, and output as complex time waveform data $u\{k/(Nf_0)\}$ (where $k=0, 1, 2, \ldots, N-1$), which is parallel data. The complex time waveform data $u\{k/(Nf_0)\}$ is expressed by the following Expression (2).

$$u\left(\frac{k}{Nf_0}\right) = \sum_{n=0}^{N-1} d_n \left(e^{j\frac{2\pi}{N}}\right)^{nk} \tag{2}$$

$$(k = 0, 1, 2, \ldots, N-1)$$

The P/S converting and GI adding circuit 104 adds GI data to the complex time waveform data $u\{k/(Nf_0)\}$, which is the output of the IFFT circuit 103, and further converts the complex time waveform data $u\{k/(Nf_0)\}$ with the GI data into serial time-series data. The serial time-series data is output as a complex digital baseband signal, which is a complex number. A section of $k=0$ to $N-1$ in Expression (2) is a time length of one symbol in OFDM, which is referred to as an OFDM symbol. A GI is a time interval provided between OFDM symbols in order to prevent interference of delayed waves. A GI is generally allocated at the head of an OFDM symbol, and filled with the OFDM symbol tail waveform of an equal time length.

The timing adjusting circuit 106 delays the complex digital baseband signal by a predetermined time, and outputs the delayed complex digital baseband signal. The PA 111 is controlled by the PA control circuit 114.

On the other hand, the carrier-band OFDM signal should be input to the PA 111 after control setting of the PA 111 has been completed, and is delayed by the timing adjusting circuit 106 to compensate for a delay time of the PA control circuit 114.

The D/A converter 107 receives a complex digital baseband signal, which is an output of the timing adjusting circuit 106, and outputs a complex analog baseband signal, which is an analog waveform having an in-phase signal (I signal) $S_I(t)$ and a quadrature signal (Q signal) $S_Q(t)$ expressed by the following Expressions (3) and (4).

$$s_I(t) = \sum_{n=0}^{N-1} \{a_n \cos(2\pi n f_0 t) - b_n \sin(2\pi n f_0 t)\} \quad (3)$$

$$s_Q(t) = \sum_{n=0}^{N-1} \{a_n \sin(2\pi n f_0 t) + b_n \cos(2\pi n f_0 t)\} \quad (4)$$

The frequency converter 108 mixes the in-phase signal (I signal) $S_I(t)$ and the quadrature signal (Q signal) $S_Q(t)$, which are comprised in the complex analog baseband signal, with a local oscillation signal as a carrier wave, which is an output of the local oscillator 109, cancels image component, and converts input signals into a carrier-band OFDM signal S(t) expressed by the following Expression (5) at last.

$$s(t) = \sum_{n=0}^{N-1} [a_n \cos\{2\pi(f_c + nf_0)t\} - b_n \sin\{2\pi(f_c + nf_0)t\}] \quad (5)$$

The analog filter 110 removes an undesired wave from the carrier-band OFDM signal from the frequency converter 108, and outputs a removal result to the PA 111.

On the other hand, symbol point information of each subcarrier of OFDM, which is subjected to parallel conversion by the S/P converter 102, is also input to the PA control circuit 114. A complex symbol input to the PA control circuit 114 becomes $c_n$ (n=0, ..., N−1).

The IFFT circuit 112 transforms the parallel conversion output of the S/P converter 102, which is input to the PA control circuit 114, according to the IFFT, and outputs complex time waveform data for PA control $v\{k/(Nf_0)\}$ (where k=0, 1, 2, ..., N−1), which is parallel data, expressed by the following Expression (6).

$$v\left(\frac{k}{Nf_0}\right) = \sum_{n=0}^{N-1} c_n \left(e^{j\frac{2\pi}{N}}\right)^{nk} \quad (6)$$

$(k = 0, 1, 2, \ldots, N-1)$

Here, the complex symbol $c_n$ corresponds to the complex symbol $d_n$, the complex time waveform data for PS control $v\{k/(Nf_0)\}$ (where k=0, 1, 2, ..., N−1) corresponds to complex time waveform data $u\{k/(Nf_0)\}$, and the numbers of data are equal. However, the PA control does not need arithmetic precision as signal generation. Therefore, $c_n$ and $v\{k/(Nf_0)\}$ allow to decrease the effective number of digits in the arithmetic operation as compared to $d_n$ and $u\{k/(Nf_0)\}$, so that a scale of an arithmetic operation circuit and an arithmetic processing amount can be decreased. Consequently, it is possible to speed up an arithmetic operation, reduce power consumption, and lower cost.

The P/S converting and GI waveform adding circuit 113 adds GI data to the complex time waveform data for PA control $v\{k/(Nf_0)\}$, which is the output of the IFFT circuit 112, further converts the addition result into serial time-series data, and outputs a complex digital baseband signal for PA control, which is a complex number. The digital filter 121 extracts a required band from the complex digital baseband signal for PA control, and outputs an extraction result.

A broadband circuit having a control band from a lowest subcarrier frequency or less to a highest subcarrier frequency or more is necessary for the PA control circuit 114 if the PA control circuit 114 is needed to provide the PA 111 with a PS voltage and a PA control signal by following all subcarriers. The broadband operation causes an increase in circuit scale and an increase in power consumption according to an increase in an arithmetic operation amount in digital processing, and a demand of a broadband analog circuit and an increase in power consumption in analog processing, further leading to an increase in cost.

On the other hand, in the OFDM scheme, as described above, it is possible to set a radio modulation scheme and transmission power for each subcarrier or each subcarrier segment, or to use only some subcarriers. It is possible to reduce an arithmetic operation amount of digital processing and introduce a cheap analog processing system with a narrow band and suppress power consumption and circuit cost if the above-described control band can be set only for a frequency band of a subcarrier segment set to a multi-valued radio modulation scheme, which is susceptible to the non-linear distortion by the amplifier, or high power, which is dominant in occurrence of non-linear distortion, or exactly used subcarriers.

In this first embodiment, it is possible to obtain the above-described advantageous effects by installing the digital filter 121 and limiting the control band.

In addition, the symbol mapping circuit 101 preferentially allocates a subcarrier segment set to a multi-valued radio modulation scheme, which is susceptible to the non-linear distortion by the amplifier, or the high power, which is dominant in the occurrence of non-linear distortion, or subcarriers to be exactly used to low-frequency subcarriers, so that an operation speed of the PA control circuit 114 is decreased. Further, it is possible to reduce the arithmetic operation amount and configure a low-speed circuit by fixing allocation to low-frequency subcarriers. As a result, it is possible to suppress power consumption and circuit cost. These are also some improvements obtained by the band limitation.

The real component extracting circuit 122 extracts a real component from a digital baseband signal for PA control, which is the output of the digital filter 121, and outputs a real digital baseband signal for PA control. The amplitude detecting circuit 123 obtains the amplitude of the real digital baseband signal for PA control, and converts the amplitude into an amplitude signal. There is a method of obtaining an absolute value as a method of detecting the amplitude. The amplitude signal is input to the control signal converting circuit 124, and converted into a PS control signal and a PA control signal.

The timing adjusting circuit 125 delays the PS control signal by a predetermined time so as to compensate for response delay of the DC/DC converter 116, and inputs the delayed PS control signal to the DC/DC converter 116. The DC/DC converter 116 provides a voltage based on the PS control signal to the PA 111. On the other hand, the timing adjusting circuit 126 delays the PA control signal by a predetermined time so as to compensate for response delay of the PA 111, and provides the delayed PA control signal to the PA 111.

The PA 111 amplifies and outputs the carrier-band OFDM signal from the analog filter 110 with the voltage supplied from the DC/DC converter 116 as a PS voltage, setting an internal bias current and voltage based on the PA control signal.

The amplitude signal indicates the amplitude of the carrier-band OFDM signal to be amplified by the PA 111. When the amplitude of the OFDM signal is large, the DC/DC converter 116 is controlled according to the PS control signal so that a high voltage is provided. As a result, it is possible to suppress the generation of non-linear distortion even during peak power. In addition, the internal bias current or voltage of the PA 111 is controlled according to the PA control signal so that the non-linear distortion generation is suppressed. Specifically, if an amplifier device is a bipolar transistor, a collector current is controlled by a base current control. If the amplifier device is a field-effect transistor, a drain current is controlled by a gate voltage control. When non-linear distortion is desired to be suppressed, one control method is a method of increasing a collector current or a drain current when no signal is input.

On the other hand, when the amplitude of the OFDM signal is small, the power efficiency of utilization is high in the case in which the voltage supplied from the DC/DC converter 116 to the PA 111 is low or the case in which a current flowing through a transistor or the like inside the PA 111 is set to be small. Consequently, the PS control signal and the PA control signal can be controlled to satisfy the above.

The above-described generation of the PS control signal and the PA control signal based on the amplitude signal by the control signal converting circuit 124 can be performed based on a preset conversion table, a function expression, or both. In addition, the conversion table may be also used with an interpolation or extrapolation calculation based on the table values.

There is delay in each of output voltage control of the DC/DC converter 116 and bias control in the PA 111. In addition, it is preferable that control be performed with hysteresis so that non-linear distortion suppression control is initiated before the transition from small amplitude to large amplitude of an amplified signal, and reversely is ended with delay after the transition from large amplitude to small amplitude. The control signal converting circuit 124 and the timing adjusting circuits 125 and 126 cooperatively perform hysteresis control. Specifically, the control signal converting circuit 124 shares a process of extending a period in which non-linear distortion is suppressed, and the timing adjusting circuits 125 and 126 implement hysteresis control corresponding to a transition direction of the signal amplitude by absorbing a delay characteristic difference.

Figure 2:
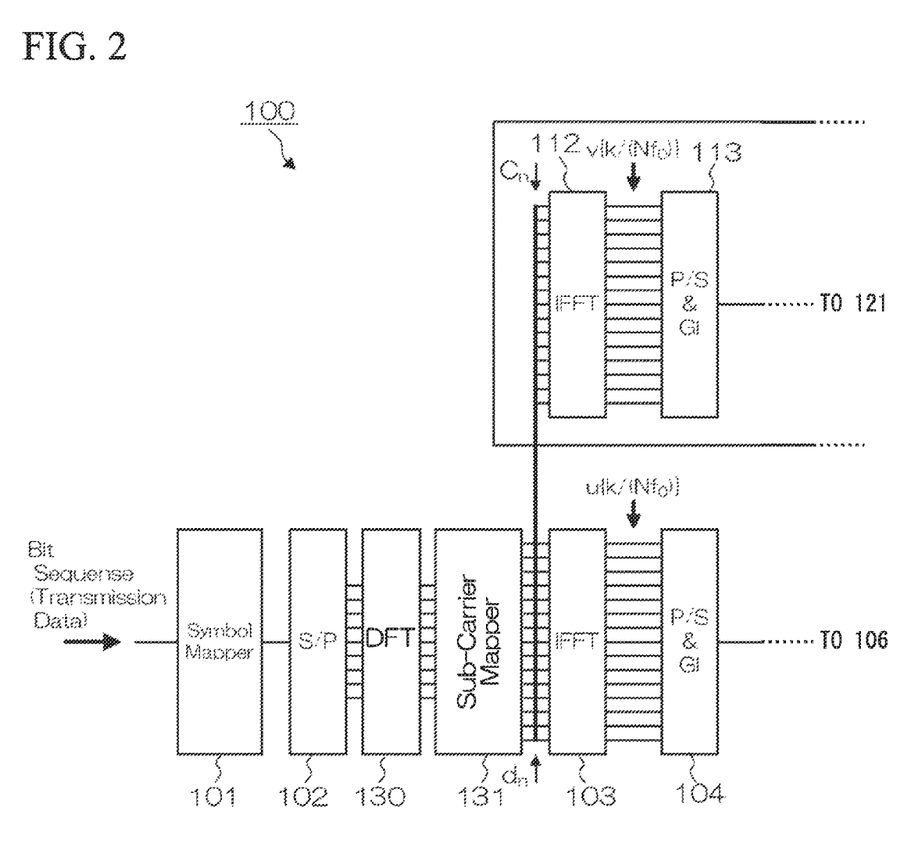
FIG. 2 is a block diagram illustrating a modified example according to the first embodiment of the present invention.

In the SC-FDMA scheme based on DFT-spread OFDM, "DFT-subcarrier mapping circuits," that is, a DFT circuit 130 and a subcarrier mapping circuit 131, are interposed between the S/P converter 102 and the IFFT circuits 103 and 112 as illustrated in FIG. 2. In this case, the same advantageous effects as described above are also obtained.

According to the above-described first embodiment, based on the OFDM symbol signal, the IFFT circuit 103, the P/S converting and GI adding circuit 104, the timing adjusting circuit 106, the D/A converter 107, the frequency converter 108, the local oscillator 109, and the analog filter 110 generate an OFDM modulated wave signal, and the PA control circuit 114, the PS 115, and the DC/DC converter 116 generate power having a predetermined voltage and a PA control signal. Consequently, it is possible that each signal is generated by calculation under the number of significant digits suitable for the signal, so that the scale of an arithmetic operation circuit and an arithmetic processing amount are decreased. As a result, it is possible to speed up an arithmetic operation and reduce power consumption.

In addition, because the digital filter 121 is provided and a control band of a control signal (a PS control signal and a PA control signal) is limited, power consumption and circuit cost can be suppressed.

In addition, the symbol mapping circuit 101 preferentially allocates a subcarrier segment set to a multi-valued radio modulation scheme, which is susceptible to the non-linear distortion by the amplifier, or the high power, which is dominant in the occurrence of non-linear distortion, or subcarriers to be exactly used to low-frequency subcarriers, so that an operation speed of the PA control circuit 114 is decreased. Further, it is possible to reduce the arithmetic operation amount and configure a low-speed circuit by fixing allocation to low-frequency subcarriers. As a result, it is possible to suppress power consumption and circuit cost.

Further, because the input of the PA control circuit 114 is a digital signal, it is possible to reduce the effect of noise and interference from the environment.

Second Embodiment

Next, the second embodiment of the present invention will be described.

Although a basic configuration of this second embodiment is the same as that of the first embodiment, a technique for generating a PA control signal is further provided in the second embodiment.

Figure 3:
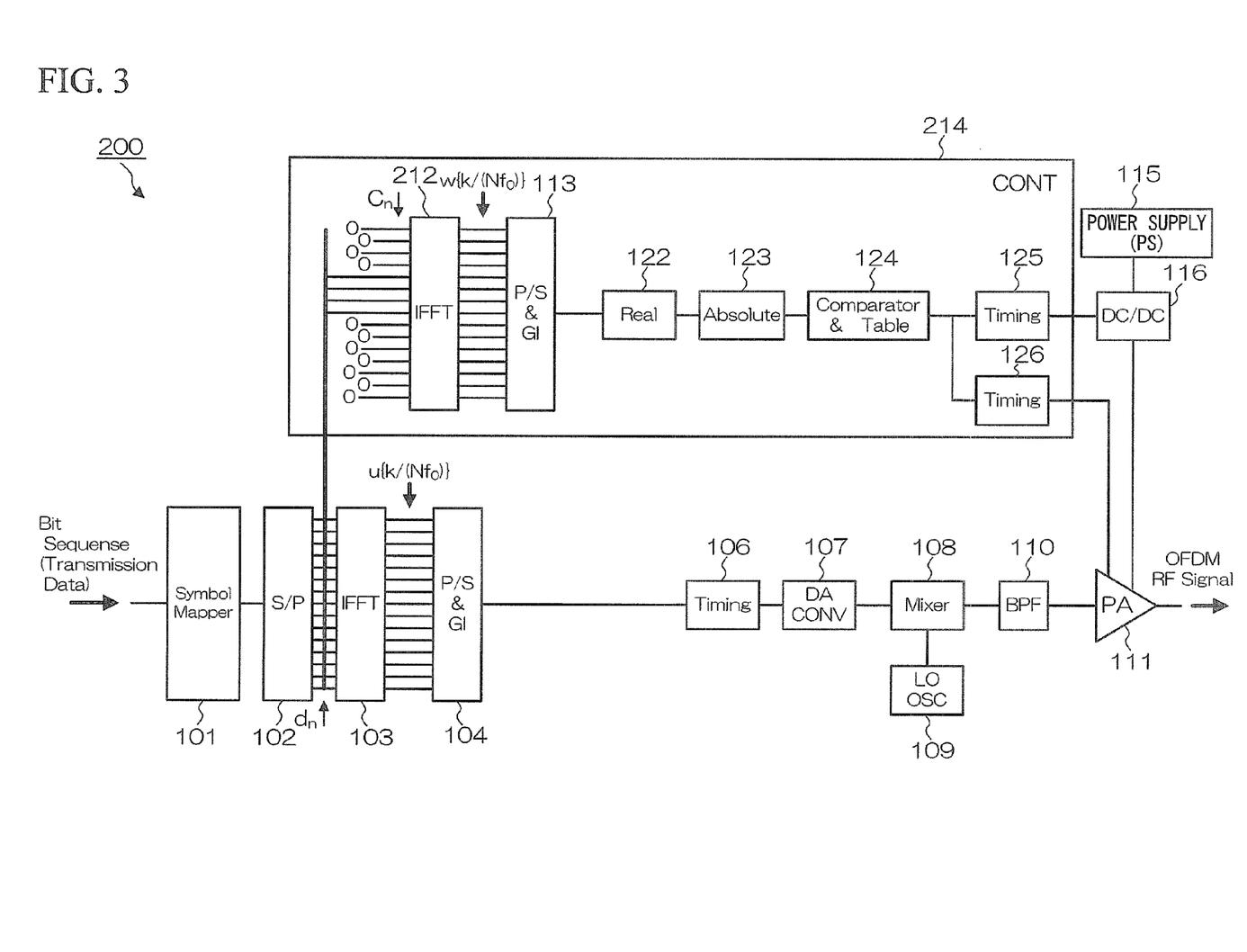
FIG. 3 is a block diagram illustrating an OFDM modulated wave transmitter apparatus according to a second embodiment of the present invention.

FIG. 3 is a block diagram illustrating an OFDM modulated wave transmitter apparatus according to this second embodiment. Parts corresponding to FIG. 1 are denoted by the same reference numerals, and description thereof is omitted. In this second embodiment, an IFFT circuit 212 and a PA control circuit (control circuit) 214 are provided instead of the IFFT circuit 112 and the PA control circuit 114 of the OFDM modulated wave transmitter apparatus 100 of FIG. 1, respectively. In addition, the digital filter 121 is omitted.

The S/P converter 102 receives a complex symbol of each subcarrier of OFDM and outputs a parallel conversion output to the IFFT circuits 103 and 212. The IFFT circuit 212 receives the parallel conversion output, selects part of the parallel conversion output by a selection circuit (not illustrated) included therein, and outputs complex time waveform data for PA control generated by performing an IFFT to the selected part. The P/S converting and GI adding circuit 113 receives an IFFT output from the IFFT circuit 212, and outputs a complex digital baseband signal for PA control, which is a complex number. The real component extracting circuit 122 receives the complex digital baseband signal for PA control, which is the output of the P/S converting and GI adding circuit 113, and outputs a real digital baseband signal for PA control, which is a real component.

Next, operations different from those of the OFDM modulated wave transmitter apparatus 100 of the first embodiment, among operations of the OFDM modulated wave transmitter apparatus 200 illustrated in FIG. 3, will be described.

The parallel conversion output of the S/P converter 102 is as shown in Expression (1). In Expression (1), n denotes each subcarrier. In the IFFT circuit 212, an arithmetic operation is performed only for complex symbols of subcarriers necessary for PA control, and complex symbols of other subcarriers are handled as 0.

Hereinafter, the case in which symbol information of $m_s^{th}$ to $m_e^{th}$ ($0 \leq m_s < m_e \leq N-1$) subcarriers is selected, is shown. An input $c_m$ ($m=0, \ldots, N-1$) of the IFFT circuit 212 is expressed by the following Expressions (7) and (8).

$$c_m = a_m + jb_m \ (m=m_s, m_s+1, \ldots, m_e-1, m_e) \quad (7)$$

$$c_m = 0 \ (m=0, \ldots, m_s-1, m_e+1, \ldots, N-1) \quad (8)$$

The IFFT circuit 212 performs an IFFT, and outputs complex time waveform data for PA control $w\{k/(Nf_0)\}$ (where $k=0, 1, 2, \ldots, N-1$), which is parallel data.

$$w\left(\frac{k}{Nf_0}\right) = \sum_{n=0}^{N-1} c_n \left(e^{j\frac{2\pi}{N}}\right)^{nk} = \sum_{n=m_s}^{m_e} d_n \left(e^{j\frac{2\pi}{N}}\right)^{nk} \quad (9)$$

$$(k = 0, 1, 2, \ldots, N-1)$$

When the above-described Expression (9) is compared to Expression (6), it can be seen that an arithmetic operation amount is obviously reduced from a difference of an addition range. In addition, the selection of complex symbols of subcarriers shown in Expressions (7) and (8) limits subcarriers required for the arithmetic operation, and also limits a band of complex time waveform data for PA control w{k/(Nf$_0$)} output by the IFFT. Consequently, the same advantageous effects as those of the digital filter 121 in FIG. 1 are obtained. Further, in this second embodiment, it is possible to more flexibly obtain filter effects suitable for use of an OFDM signal because a filter can be set for each subcarrier. Although the case in which continuous (adjacent) subcarriers in frequency are selected in the above-described example has been shown, discontinuous subcarriers may be selected.

In addition, when 0 is substituted into the input c$_m$ of the IFFT circuit 212, it is possible to suppress an arithmetic operation amount and hence suppress power consumption by performing a process of bypassing a calculation path in which the multiplication of 0 occurs in an arithmetic operation of the IFFT circuit (in general, a butterfly calculation is well-known), instead of performing an arithmetic operation of simply substituting 0 as arithmetic data. In addition, when subcarriers to be used are fixed to some frequencies, it is possible to reduce a circuit scale by omitting an arithmetic operator corresponding to unused subcarriers in a circuit.

The selection of complex symbols of subcarriers can be performed by an output circuit to the IFFT circuit 212 within the S/P converter 102 as well as by providing a selection circuit within the IFFT circuit 212. Further, because an object of PA control is to compensate for non-linear distortion of a carrier-band OFDM signal, a baseband signal used for compensation can be generated with shifting a subcarrier frequency to a lowest frequency as shown in Expressions (10) and (11).

$$c_n = a_m + jb_m \ (n = m - m_s, m = m_s, m_s + 1, \ldots, m_e - 1, m_e) \quad (10)$$

$$c_n = 0 \ (n = m_e - m_s + 1, \ldots, N-1) \quad (11)$$

As a result, it is possible to further decrease a control frequency band, leading to the reduction of an arithmetic operation amount of digital processing and the introduction of a low-speed analog processing system.

According to the above-described second embodiment, it is possible to limit the control frequency band even when there is no BPF 121 because the PA control circuit 214 generates a control signal by selectively receiving a part of the OFDM symbol signal. As a result, it is possible to suppress an arithmetic operation amount and the cost of an analog circuit and further suppress the circuit scale and power consumption.

In addition, according to this second embodiment, a baseband signal to be used for compensation can be generated with shifting a subcarrier frequency to a lowest frequency. As a result, it is possible to further decrease a control frequency band, reduce an arithmetic operation amount of digital processing, and introduce a low-speed analog processing system.

Third Embodiment

Next, the third embodiment of the present invention will be described.

Although a basic configuration of this third embodiment is the same as that of the first embodiment, a different technique for generating a PA control signal is further provided in the third embodiment.

Figure 4:
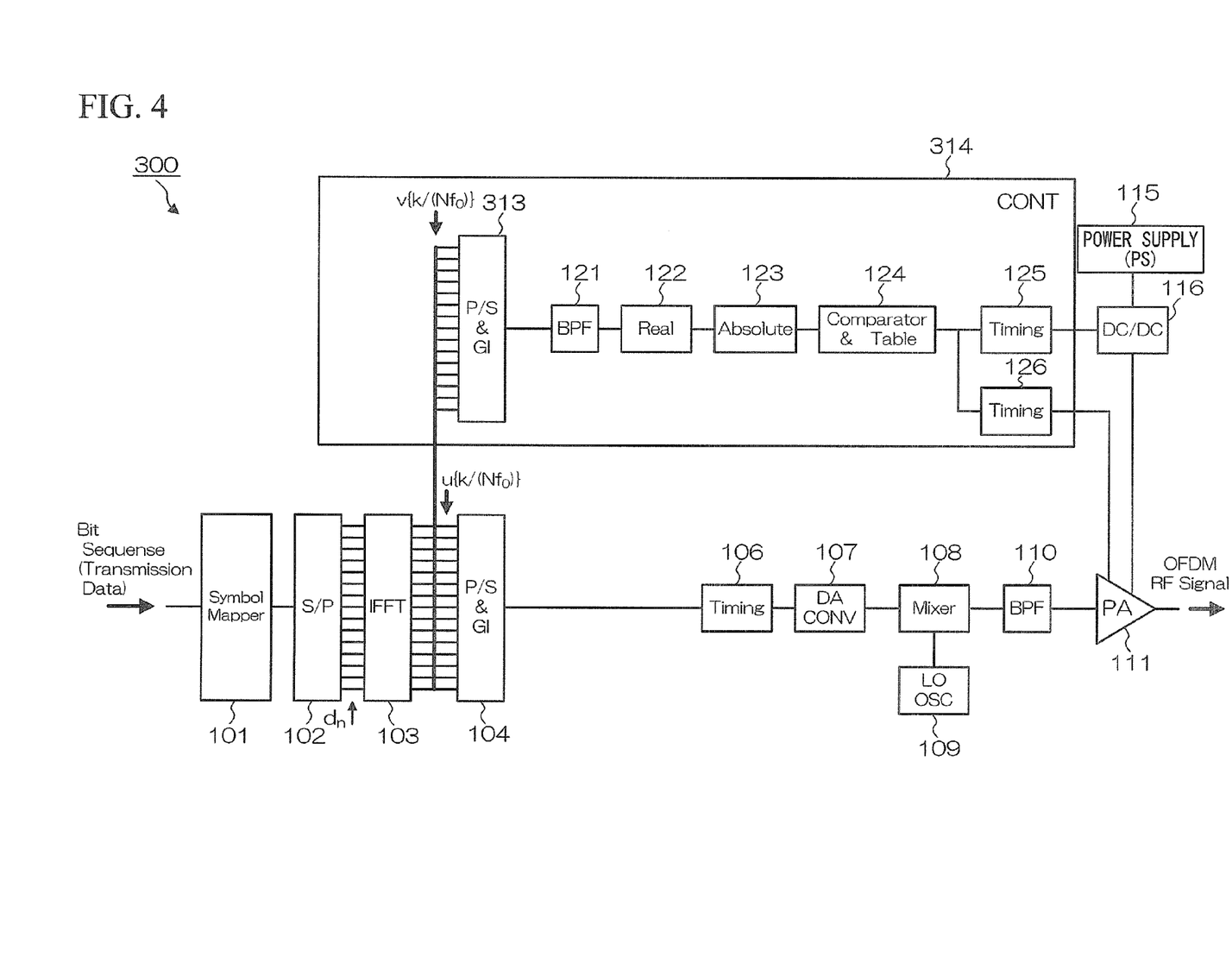
FIG. 4 is a block diagram illustrating an OFDM modulated wave transmitter apparatus according to a third embodiment of the present invention.

FIG. 4 is a block diagram illustrating an OFDM modulated wave transmitter apparatus according to this third embodiment. Parts corresponding to FIG. 1 are denoted by the same reference numerals and description thereof is omitted. In this third embodiment, a P/S converting and GI adding circuit 313 and a PA control circuit (control circuit) 314 are provided instead of the P/S converting and GI adding circuit 113 and the PA control circuit 114 of the OFDM modulated wave transmitter apparatus 100 of FIG. 1, respectively. In addition, the IFFT circuit 112 is omitted.

The IFFT circuit 103 outputs complex time waveform data, which is an IFFT output, to the P/S converting and GI adding circuits 104 and 313. The P/S converting and GI adding circuit 313 receives the complex time waveform data from the IFFT circuit 103, and outputs a complex digital baseband signal for PA control, which is a complex number, to the digital filter 121.

Next, operations different from those of the first and second embodiments, among operations of the OFDM modulated wave transmitter apparatus 300 illustrated in FIG. 4, will be described.

In this third embodiment, it is possible to reduce the circuit scale and arithmetic operation amount, and hence reduce power consumption, by directly inputting complex time waveform data, which is an IFFT output of the IFFT circuit 103, to the P/S converting and GI adding circuit 313, and omitting the IFFT circuit 112.

On the other hand, the reduction of the number of significant digits provided in the IFFT circuit 112 and the effect of subcarrier selection provided in the IFFT circuit 212 of the second embodiment is absent. In order to compensate for this, the P/S converting and GI adding circuit 313 selects, captures and processes only higher-bit data enough for the number of significant digits necessary for PA control within complex time waveform data from the IFFT circuit 103, and similarly generates a complex digital baseband signal for PA control of which the number of significant bits has been reduced. As a result, it is possible to reduce the circuit scale and the arithmetic operation amount and hence reduce the power consumption as compared to when information of all complex time waveform data is input and processed.

According to the above-described third embodiment, the PA control circuit 314 receives complex time waveform data from the IFFT circuit 103, and generates a control signal for the DC/DC converter 116 and the PA 111, so that it is possible to omit an inverse Fourier transform calculation for obtaining complex time waveform data for PA control from complex symbols. As a result, it is possible to suppress the circuit scale and the arithmetic operation amount and further suppress the power consumption.

Fourth Embodiment

Next, the fourth embodiment of the present invention will be described.

Although a basic configuration of this fourth embodiment is the same as that of the first embodiment, a different technique for generating a PA control signal is further provided in the fourth embodiment.

Figure 5:
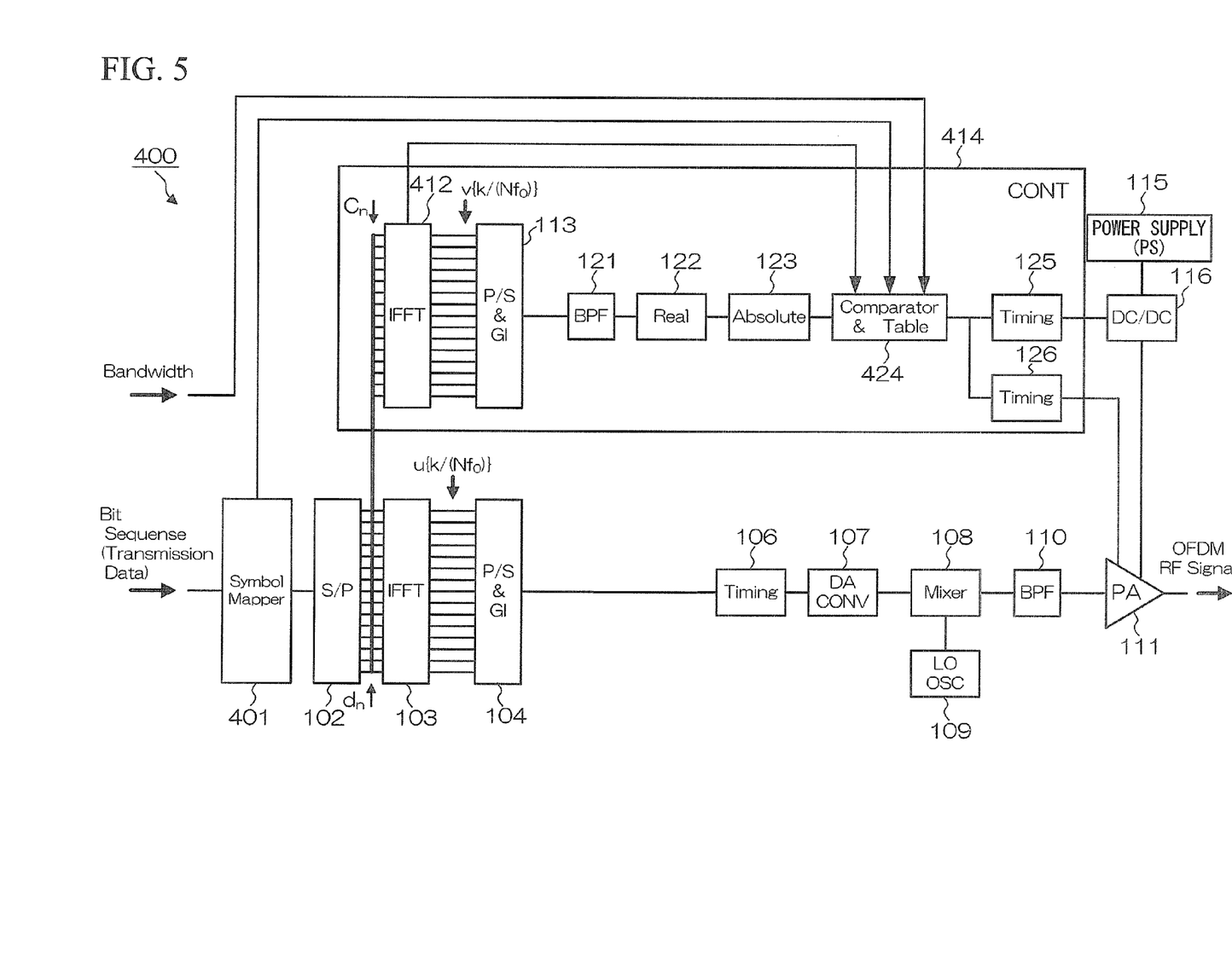
FIG. 5 is a block diagram illustrating an OFDM modulated wave transmitter apparatus according to a fourth embodiment of the present invention.

FIG. 5 is a block diagram illustrating an OFDM modulated wave transmitter apparatus according to the fourth embodiment. Parts corresponding to FIG. 1 are denoted by the same reference numerals, and description thereof is omitted. In this fourth embodiment, a PA control circuit (control circuit) 414 and a control signal converting circuit 424 are provided instead of the PA control circuit 114 and the control signal converting circuit 124 of the OFDM modulated wave transmitter apparatus 100 of FIG. 1, respectively.

In addition, as described below, optionally, a symbol mapping circuit 401 is provided instead of the symbol mapping circuit 101, and an IFFT circuit 412 is provided instead of the IFFT circuit 112.

Next, operations different from those of the first to third embodiments, among operations of the OFDM modulated wave transmitter apparatus 400 illustrated in FIG. 5, will be described.

If subcarriers of only some frequencies in OFDM signal are often used and particularly the repetition of uses of higher frequency subcarriers is small, it may be advantageous that a frequency band which the PA control circuit 114 can follow is narrower than the entire subcarrier band because of the cost reduction using a low-speed circuit and the reduction of power consumption by a low-speed operation, when its effect is compared with the cost and power consumption of the PA control circuit 114 of FIG. 1.

In this fourth embodiment, on the above-described condition, the control signal converting circuit 424 recognizes whether or not a carrier-band OFDM signal to be amplified by the PA 111 is within a band capable of being followed by the PA control circuit 414. If the carrier-band OFDM signal exists outside the band capable of being followed, an operation to make an output voltage of the DC/DC converter 116 follow OFDM signal amplitude stops, and a PS control signal and a PA control signal in which non-linear distortion of the PA 111 is lowest are output.

In the above-described band recognition by the control signal converting circuit 424, band (bandwidth) information may be input from an outside of the OFDM modulated wave transmitter apparatus 400 to the control signal converting circuit 424. In addition, because the symbol mapping circuit 401 and the IFFT circuit 412 recognizes a subcarrier band to be used, the band information may be input from the symbol mapping circuit 401 and the IFFT circuit 412 to the control signal converting circuit 424.

According to the above-described fourth embodiment, the band information is input to the PA control circuit 414. Therefore, the control signal converting circuit 424 can supply the PA 111 with power and a PA control signal having a predetermined voltage, regardless of a control signal by an arithmetic operation, when recognizing that a broadband OFDM modulated wave signal, which exceeds control bands of the PA control circuit 414, the PA 111, and the DC/DC converter 116, is generated. As a result, when a repetition of generation of the broadband OFDM modulated wave signal is low, it is possible to implement cost reduction and power-consumption reduction.

Hereinafter, advantageous effects of the above-described first to fourth embodiments will be summarized.

According to the above-described first embodiment, based on the OFDM symbol signal, the IFFT circuit 103, the P/S converting and GI adding circuit 104, the timing adjusting circuit 106, the D/A converter 107, the frequency converter 108, the local oscillator 109, and the analog filter 110 generate an OFDM modulated wave signal, and the PA control circuit 114, the PS 115, and the DC/DC converter 116 generate power having a predetermined voltage and a PA control signal. Consequently, it is possible that each signal is generated by calculation under the number of significant digits suitable for the signal, so that the scale of an arithmetic operation circuit and an arithmetic processing amount are decreased. As a result, it is possible to speed up an arithmetic operation and reduce power consumption.

In addition, because the digital filter 121 is provided and a control band of a control signal (a PS control signal and a PA control signal) is limited, power consumption and circuit cost can be suppressed.

In addition, the symbol mapping circuit 101 preferentially allocates a subcarrier segment set to a multi-valued radio modulation scheme, which is susceptible to the non-linear distortion by the amplifier, or the high power, which is dominant in the occurrence of non-linear distortion, or subcarriers to be exactly used to low-frequency subcarriers, so that an operation speed of the PA control circuit 114 is decreased. Further, it is possible to reduce the arithmetic operation amount and configure a low-speed circuit by fixing allocation to low-frequency subcarriers. As a result, it is possible to suppress power consumption and circuit cost.

Further, because the input of the PA control circuit 114 is a digital signal, it is possible to reduce the effect and noise or interference from the environment.

In addition, according to the above-described second embodiment, it is possible to limit the control frequency band even when there is no BPF 121 because the PA control circuit 214 generates a control signal by selectively receiving a part of an OFDM symbol signal. As a result, it is possible to suppress an arithmetic operation amount and the cost of an analog circuit and further suppress the circuit scale and power consumption.

In addition, according to the second embodiment, a baseband signal to be used for compensation can be generated with shifting a subcarrier frequency to a lowest frequency. As a result, it is possible to further decrease a control frequency band, reduce an arithmetic operation amount of digital processing, and introduce a low-speed analog processing system.

Further, according to the above-described third embodiment, the PA control circuit 314 receives complex time waveform data from the IFFT circuit 103, and generates a control signal for the DC/DC converter 116 and the PA 111, so that it is possible to omit an inverse Fourier transform calculation for obtaining complex time waveform data for PA control from complex symbols. As a result, it is possible to suppress the circuit scale and the arithmetic operation amount and further suppress the power consumption.

In addition, according to the above-described fourth embodiment, the band information is input to the PA control circuit 414. Therefore, it is possible to supply the PA 111 with power and a PA control signal having a predetermined voltage, regardless of a control signal by an arithmetic operation, when recognizing that a broadband OFDM modulated wave signal, which exceeds control bands of the PA control circuit 414, the PA 111, and the DC/DC converter 116, is generated. As a result, when a repetition of generation of the broadband OFDM modulated wave signal is low, it is possible to implement cost reduction and power-consumption reduction.

This application is based upon and claims the benefit of priority from prior Japanese Patent Application No. 2010-4135, filed Jan. 12, 2010, the entire contents of which are incorporated herein.

INDUSTRIAL APPLICABILITY

The present invention is applicable to a broadcasting wireless communication apparatus, a mobile wireless communication apparatus, a subscriber wireless communication apparatus, and a wireless local area network apparatus using an OFDM scheme.

REFERENCE SYMBOLS 100, 200, 300, 400 OFDM modulated wave transmitter apparatus
101, 401 Symbol mapping circuit
102 S/P converter
103, 112, 212, 412 IFFT circuit
104, 113, 313 P/S converting and GI adding circuit
106, 125, 126 Timing adjusting circuit
107 D/A converter
108 Frequency converter
109 Local oscillator
110 Analog filter
111 PA
114, 214, 314, 414 PA control circuit (control circuit)
115 Power supply
116 DC/DC converter
121 Digital filter
122 Real component extracting circuit
123 Amplitude detecting circuit
124 Control signal converting circuit
130 DFT circuit
131 Subcarrier mapping circuit

The invention claimed is:

1. An orthogonal frequency division multiplex (OFDM) modulated wave transmitter apparatus comprising:
    an OFDM symbol signal generating circuit which generates an OFDM symbol signal from transmission data;
    an OFDM signal generating circuit which generates an OFDM modulated wave signal from the OFDM symbol signal;
    a control circuit which generates a power supply (PS) control signal and a power amplifier (PA) control signal from the OFDM symbol signal;
    a converter which controls an output voltage of a PS based on the PS control signal generated by the control circuit; and
    an amplifier which amplifies and outputs the OFDM modulated wave signal generated by the OFDM signal generating circuit based on at least one of the output voltage controlled by the converter and the PA control signal generated by the control circuit.

2. The OFDM modulated wave transmitter apparatus according to claim 1, wherein the control circuit further includes a filter for limiting bands of the PS control signal and the PA control signal.

3. The OFDM modulated wave transmitter apparatus according to claim 1, wherein the OFDM symbol signal generating circuit generates an OFDM symbol signal having a subcarrier arrangement to prevent non-linear distortion from being generated.

4. The OFDM modulated wave transmitter apparatus according to claim 1, wherein the control circuit generates the PS control signal and the PA control signal from part of the OFDM symbol signal.

5. The OFDM modulated wave transmitter apparatus according to claim 4, wherein the control circuit includes an inverse fast Fourier transform (IFFT) circuit for bypassing a calculation path in which multiplication of 0 occurs when symbol information of some subcarriers is subjected to an IFFT.

6. The OFDM modulated wave transmitter apparatus according to claim 1, wherein:
    the OFDM signal generating circuit generates an OFDM baseband signal from the OFDM symbol signal, and generates the OFDM modulated wave signal from the OFDM baseband signal, and
    the control circuit generates the PS control signal and the PA control signal from the OFDM baseband signal.

7. The OFDM modulated wave transmitter apparatus according to claim 6, wherein the control circuit further includes a filter for limiting bands of the PS control signal and the PA control signal.

8. The OFDM modulated wave transmitter apparatus according to claim 1, wherein:
    the control circuit generates the PS control signal and the PA control signal from the OFDM symbol signal based on whether or not the OFDM modulated wave signal is within a band capable of being followed, and
    the control circuit invalidates a control of the PS output voltage according to the converter if the OFDM symbol signal exists outside the band capable of being followed, and generates a power control signal so that a preset output voltage is output from the converter.

9. An orthogonal frequency division multiplex (OFDM) modulated wave transmission method comprising:
    generating an OFDM symbol signal from transmission data;
    generating an OFDM modulated wave signal from the OFDM symbol signal;
    generating a power supply control signal and a power amplifier control signal from the OFDM symbol signal;
    controlling an output voltage of a power supply based on the power supply control signal; and
    amplifying and outputting the OFDM modulated wave signal based on at least one of the controlled output voltage and the power amplifier control signal.

10. A non-transitory computer readable recording medium storing a program for causing a computer for controlling an orthogonal frequency division multiplex (OFDM) modulated wave transmitter apparatus to execute:
    an OFDM symbol signal generating function of generating an OFDM symbol signal from transmission data;
    an OFDM signal generating function of generating an OFDM modulated wave signal from the OFDM symbol signal;
    a control function of generating a power supply control signal and a power amplifier control signal from the OFDM symbol signal;
    a converting function of controlling an output voltage of a power supply based on the power supply control signal; and
    an amplifying function of amplifying and outputting the OFDM modulated wave signal based on at least one of the controlled output voltage and the power amplifier control signal.

11. The OFDM modulated wave transmitter apparatus according to claim 2, wherein the OFDM symbol signal generating circuit generates an OFDM symbol signal having a subcarrier arrangement to prevent non-linear distortion from being generated.

* * * * *